(12) United States Patent
Uchiyama

(10) Patent No.: US 12,260,282 B2
(45) Date of Patent: Mar. 25, 2025

(54) CARD READER

(71) Applicant: NIDEC INSTRUMENTS CORPORATION, Nagano (JP)

(72) Inventor: Ryo Uchiyama, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/510,951

(22) Filed: Nov. 16, 2023

(65) Prior Publication Data
US 2024/0160864 A1    May 16, 2024

(30) Foreign Application Priority Data
Nov. 16, 2022  (JP) .................. 2022-183355

(51) Int. Cl.
*G06K 7/00*    (2006.01)

(52) U.S. Cl.
CPC .................. *G06K 7/0013* (2013.01)

(58) Field of Classification Search
CPC ....... G07F 1/041; G07F 19/205; G07D 11/00; G07D 11/237; G07D 7/187; G06K 7/0091; G06K 7/0078; G06K 7/0056; G06K 7/0013
See application file for complete search history.

(56) References Cited

U.S. PATENT DOCUMENTS

| | | | | |
|---|---|---|---|---|
| 3,553,436 A * | 1/1971 | Webb | ................. | G06K 7/04 235/447 |
| 4,441,018 A * | 4/1984 | Wessel | ................. | G06K 7/10831 235/458 |
| 5,484,989 A * | 1/1996 | Kumar | ................. | G06K 13/0875 277/906 |
| 5,739,509 A * | 4/1998 | Watanabe | ................. | G07D 11/26 235/475 |
| 5,905,252 A * | 5/1999 | Magana | ................. | G06K 13/0875 235/475 |
| 6,042,010 A * | 3/2000 | Kanayama | ................. | G06K 7/084 235/379 |
| 6,474,550 B1 * | 11/2002 | Caridas | ................. | G06K 13/0893 235/379 |
| 7,350,705 B1 * | 4/2008 | Frederick | ................. | G06K 7/0021 235/475 |

(Continued)

FOREIGN PATENT DOCUMENTS

| | | |
|---|---|---|
| JP | 2009080611 A | 4/2009 |
| JP | 2019008713 A | 1/2019 |
| JP | 2019008714 A | 1/2019 |

*Primary Examiner* — Daniel I Walsh
(74) *Attorney, Agent, or Firm* — CANTOR COLBURN LLP

(57) ABSTRACT

A card reader includes a card accommodating part which has an insertion port into which a card is inserted, accommodates at least a part of the card having been inserted, and has a discharge hole which is capable of discharging a foreign matter in an inside of the card accommodating part, and a foreign matter accommodation member which accommodates the foreign matter discharged through the discharge hole and is capable of being attached and detached. The foreign matter accommodation member structures an airtight space together with the card accommodating part, and the airtight space is airtight in a portion at least except the insertion port.

5 Claims, 6 Drawing Sheets

(56) References Cited

U.S. PATENT DOCUMENTS

| | | | | |
|---|---|---|---|---|
| 8,573,479 | B1* | 11/2013 | Jenkins | G07F 19/201 |
| | | | | 235/375 |
| 8,833,646 | B1* | 9/2014 | Crews | G06Q 20/1085 |
| | | | | 902/4 |
| 2003/0047607 | A1* | 3/2003 | Swanson | G06K 7/14 |
| | | | | 235/454 |
| 2009/0128982 | A1* | 5/2009 | Oshima | H05K 9/0067 |
| | | | | 361/212 |
| 2009/0178562 | A1* | 7/2009 | Nochi | B03C 3/88 |
| | | | | 96/24 |
| 2011/0155540 | A1* | 6/2011 | Ugajin | G07D 11/50 |
| | | | | 198/780 |
| 2016/0162712 | A1* | 6/2016 | Ozawa | G06K 7/084 |
| | | | | 235/440 |
| 2017/0185812 | A1* | 6/2017 | Ozawa | G06K 13/08 |
| 2018/0375541 | A1* | 12/2018 | Yoo | G06K 19/07741 |
| 2019/0005279 | A1* | 1/2019 | Miyazawa | G06K 7/087 |
| 2019/0384946 | A1* | 12/2019 | Momose | G06K 13/0881 |
| 2019/0385028 | A1* | 12/2019 | Ozawa | G07D 11/225 |
| 2023/0169815 | A1* | 6/2023 | Murao | G07D 1/00 |
| | | | | 271/264 |
| 2023/0237850 | A1* | 7/2023 | Figueiredo | G06F 18/24133 |
| | | | | 340/573.1 |
| 2024/0054300 | A1* | 2/2024 | Takeda | G07F 19/2055 |
| 2024/0160864 | A1* | 5/2024 | Uchiyama | G06K 7/0013 |

* cited by examiner

CARD READER

CROSS REFERENCE TO RELATED APPLICATION

The present invention claims priority under 35 U.S.C. § 119 to Japanese Application No. 2022-183355 filed Nov. 16, 2022, the entire content of which is incorporated herein by reference.

TECHNICAL FIELD

At least an embodiment of the present invention may relate to a card reader.

BACKGROUND

Conventionally, a card reader has been known which is mounted on a transaction terminal apparatus such as an ATM (Automated Teller Machine) and is capable of performing reading and the like of magnetic data stored in a magnetic stripe of a magnetic card.

Various foreign matters such as a card piece, paper money, a coin and a paper scrap are easily entered into an inside of a card accommodating part of a card reader. When a foreign matter entered into the card accommodating part of a card reader is released from the card reader, the foreign matter may enter into other devices which are mounted on a host apparatus such as an ATM or the like together with the card reader. In order to prevent this problem, a structure has been known in which a card reader is provided with an airtight structure so that a foreign matter entered into a card accommodating part of the card reader is not released or does not go out from the card reader.

In Japanese Patent Laid-Open No. 2019-8713 (Patent Literature 1), a card reader is described which includes a waterproof cover for preventing entry of liquid from a card moving passage. In Japanese Patent Laid-Open No. 2019-8714 (Patent Literature 2), a card reader is described which has a structure for preventing entry of liquid into a waterproof region. In Japanese Patent Laid-Open No. 2009-80611 (Patent Literature 3), an automatic cash transaction apparatus is described in which a plurality of holes is provided in a traveling guide of a paper money automatic receiving and dispensing device and a duct for collecting foreign matters is provided on a lower side with respect to the holes.

However, in a structure that an airtight structure is provided in a card reader, for example, at a time of repair and maintenance of the card reader, it is difficult to discharge a foreign matter from an inside of the card accommodating part.

SUMMARY

In view of the problem described above, at least an embodiment of the present invention may advantageously provide a card reader which is capable of easily discharging a foreign matter while restraining unintended release of the foreign matter from an inside of the card accommodating part.

According to at least an embodiment of the present invention, there may be provided a card reader which includes a card accommodating part having an insertion port into which a card is inserted, accommodating at least a part of the card having been inserted, and having a discharge hole which is capable of discharging a foreign matter from an inside of the card accommodating part, and a foreign matter accommodation member which accommodates the foreign matter discharged through the discharge hole and is capable of being attached and detached. The foreign matter accommodation member structures an airtight space together with the card accommodating part, and the airtight space is airtight in a portion at least except the insertion port.

Effects of the Invention

According to at least an embodiment of the present invention, a foreign matter can be easily discharged while restraining unintended release of the foreign matter from an inside of the card accommodating part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

An embodiment of the present invention will be described below with reference to the accompanying drawings.

(Entire Structure of Card Reader)

Figure 1:
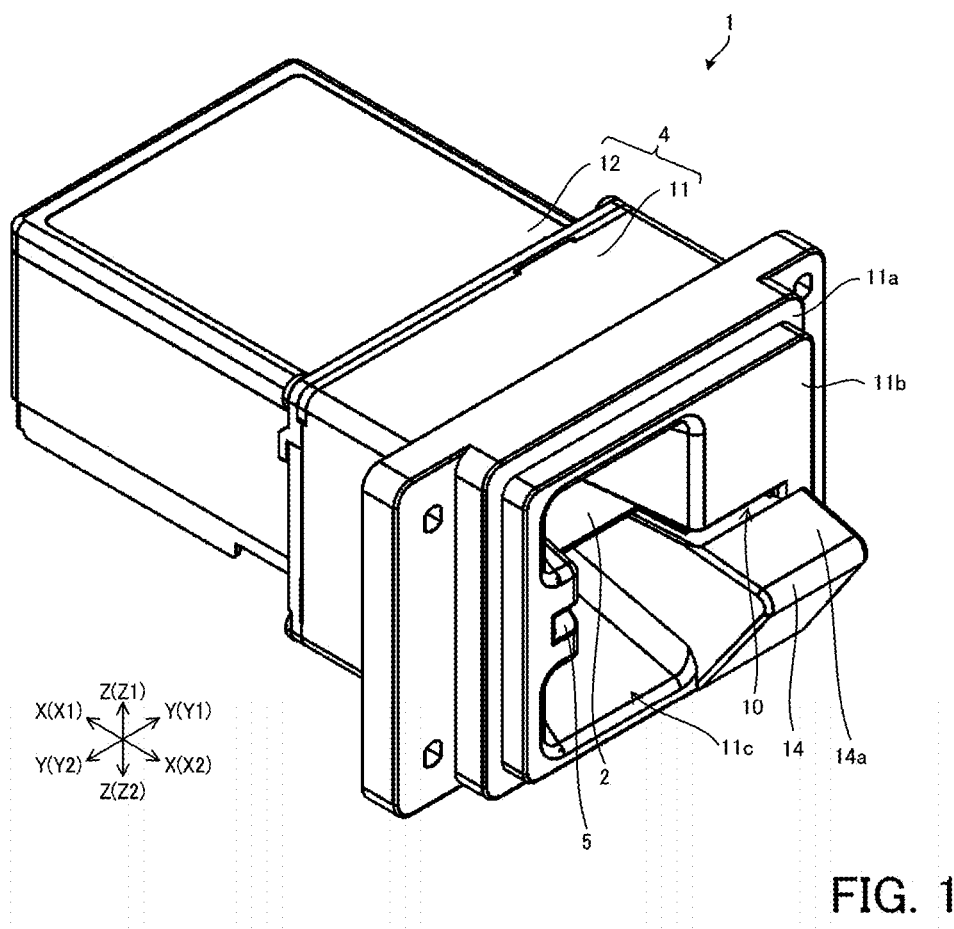
FIG. 1 is a perspective view showing a card reader 1 in accordance with an embodiment of the present invention.
Figure 2:
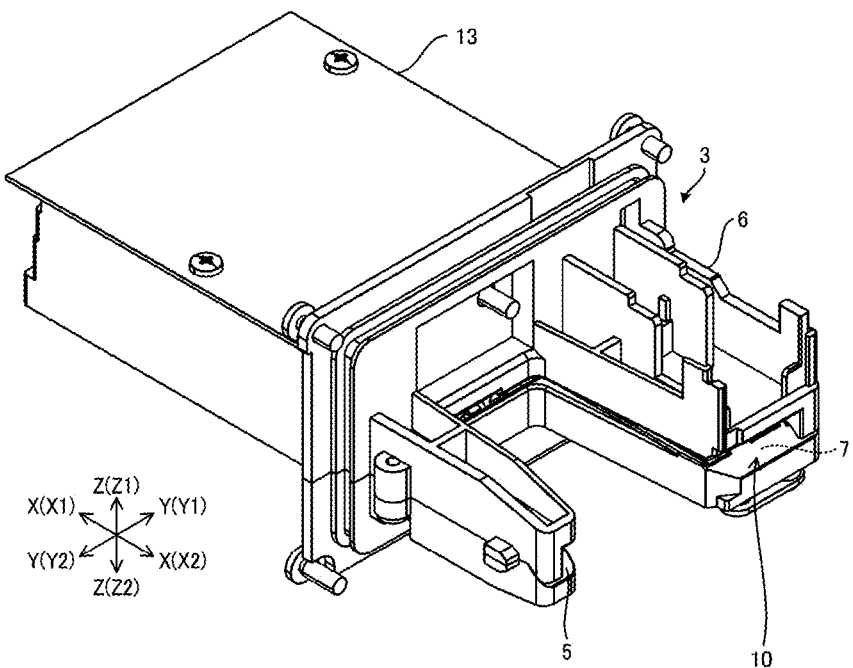
FIG. 2 is an exploded perspective view showing a state that a case body 4 is detached from the card reader 1 shown in FIG. 1.
Figure 3:
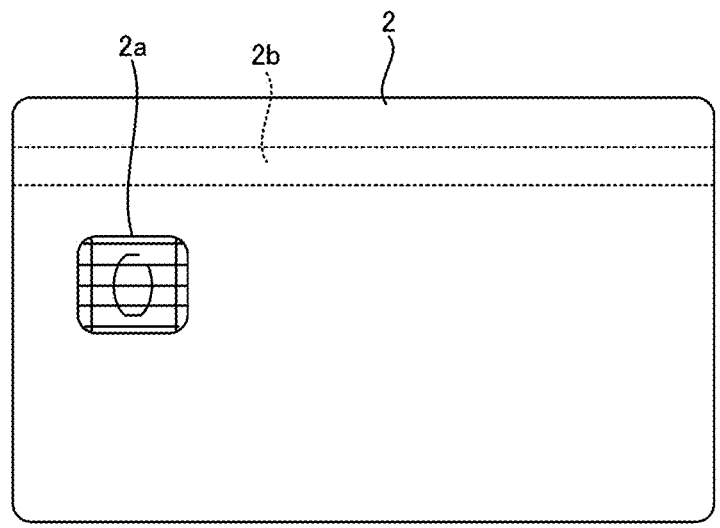
FIG. 3 is a view showing a card 2 which is an example of a reading object by the card reader 1.

FIG. 1 is a perspective view showing a card reader 1 in accordance with an embodiment of the present invention. FIG. 2 is an exploded perspective view showing a state that a case body 4 is detached from the card reader 1 shown in FIG. 1. FIG. 3 is a view showing a card 2 which is an example of a reading object by the card reader 1.

A card reader 1 in this embodiment is a device which performs reading of data recorded in a card 2. Specifically, the card reader 1 is a so-called dip type card reader in which a card 2 is manually inserted into the card reader 1 and pulled out from the card reader 1 to perform reading of data. The card reader 1 is, for example, mounted and used in an unmanned or a self-service type oiling device in a gas station or a host apparatus such as an ATM.

A card 2 is, for example, a rectangular-shaped card made of vinyl chloride whose thickness is about 0.7 mm (millimeter) to about 0.8 mm. An IC (Integrated Circuit) chip is built in the card 2, and a face on one side of the card 2 is formed with an external connection terminal 2a of the IC chip. Further, the other face of the card 2 is formed with a magnetic stripe 2b where magnetic data is recorded. The card 2 may be a PET (polyethylene terephthalate) card whose thickness is about 0.18 mm to about 0.36 mm, a paper card having a predetermined thickness, a metal card or the like.

The card reader 1 includes a card reader main body 3 and a case body 4 which covers the card reader main body 3. The card reader main body 3 includes a main body frame 6 which is formed with a card moving passage 5 where a card 2 is capable of being moved, a magnetic head 7 which performs reading of magnetic data recorded in the card 2, and an IC contact block 17 (see FIG. 8) having a plurality of IC contact springs which are capable of contacting with the external connection terminal 2a of the card 2 for performing communication of data with an IC chip built in the card 2.

The case body 4 is structured of a front face cover 11 formed with an insertion port 10 for a card 2 and a main case body 12. Further, as shown in FIG. 2, the card reader 1 includes a control board 13, which is a printed board for control, in an inside of the case body 4.

In this embodiment, a card 2 which is manually operated is moved in the "X" direction shown in FIG. 1 and the like. In other words, the "X" direction is a moving direction of a card 2 which is moved in the card moving passage 5. Further, the card 2 is inserted to the "X1" direction side and is pulled out to the "X2" direction side. Further, the "Z" direction in FIG. 1 and the like which is perpendicular to the "X" direction is a thickness direction of a card 2 which is moved in the card moving passage 5, and the "Y" direction in FIG. 1 and the like perpendicular to the "X" direction and the "Z" direction is a width direction (short width direction) of the card 2 which is moved in the card moving passage 5.

In the following descriptions, the "X" direction is referred to as a front and rear direction, the "Y" direction is referred to as a right and left direction, and the "Z" direction is referred to as an upper and lower direction. Further, the "X1" direction side which is an inserting direction side of a card 2 to the card reader 1 is referred to as a "rear" side, and the "X2" direction side which is a pulling-out direction side of a card 2 from the card reader 1 is referred to as a "front" side. Further, the "Y1" direction side which is one side in the right and left direction is referred to as a "right" side, the "Y2" direction side which is the other side in the right and left direction is referred to as a "left" side, the "Z1" direction side which is one side in the upper and lower direction is referred to as an "upper" side, and the "Z2" direction side which is the other side in the upper and lower direction is referred to as a "lower" side. Further, faces on the "X2" direction side of respective parts of the card reader 1 are referred to as their front faces. Further, the "Y" direction sides of respective parts of the card reader 1 are referred to as their side faces.

The front face cover 11 is disposed on a front face side of the main body frame 6 and covers a front face side portion of the main body frame 6. Further, the front face cover 11 structures a front face of the card reader 1. A front face of the front face cover 11 is formed with an attaching face 11a of the card reader 1 to a host apparatus. The attaching face 11a is a flat face perpendicular to the front and rear direction. Further, a front face side of the front face cover 11 is formed with an exposed part 11b which is disposed in an opening formed in a front panel of the host apparatus. The exposed part 11b is formed so as to protrude from the attaching face 11a to a front side and, when the card reader 1 is attached to the host apparatus, the exposed part 11b structures a part of the front panel of the host apparatus.

Further, the front face cover 11 is formed with a finger insertion part 11c which is recessed toward a rear side from a front face of the exposed part 11b. The finger insertion part 11c is formed in a size so that fingers of a user are capable of inserting and, when a user inserts a card 2 into the card reader 1 and, when the user pulls out the card 2 from the card reader 1, the fingers of the user are inserted into the finger insertion part 11c. An insertion port 10 is formed in the front face of the exposed part 11b and both right and left side faces and a rear face of the finger insertion part 11c.

A protruded part 14 is provided in a portion of the front face of the exposed part 11b which is adjacent to the insertion port 10. As a result, only a part of the front face of the exposed part 11b which surrounds the insertion port 10 is formed in a shape which is protruded by providing the protruded part 14 and thus, it is difficult to attach a magnetic data swindle member around the insertion port 10 in the front face of the exposed part 11b. Especially, it is difficult that a plate-shaped magnetic data swindle member having an opening part communicating with the insertion port 10 is attached to the front face of the exposed part 11b.

Further, the protruded part 14 is provided at a position adjacent to a portion of the insertion port 10 in the card reader 1 where a magnetic stripe 2b inserted into the insertion port 10 is passed, in other words, ahead of the magnetic head 7. As a result, it is further difficult to attach a magnetic data swindle member which is required to arrange a magnetic head or the like around a portion where a magnetic stripe 2b is passed for swindling magnetic data of a card 2.

The protruded part 14 is formed in a substantially triangular shape having a bottom side which is parallel to another portion of the front face of the exposed part 11b when viewed in the "Y" direction. Further, an upper face 14a of the protruded part 14 is smoothly connected with a bottom face of the insertion port 10 (card moving passage 5) and, when a card 2 is inserted so as to slide on the upper face 14a to the "X1" direction side, the card 2 can be easily inserted into the insertion port 10.

The main case body 12 is formed in a substantially rectangular parallelepiped box shape whose front end is opened. The front face cover 11 and the main case body 12 are fixed to each other in a state that a rear end of the front face cover 11 and a front end of the main case body 12 are abutted with each other. The case body 4 covers the card reader main body 3 from both sides in the upper and lower direction, both sides in the right and left direction and both sides in the front and rear direction.

The control board 13 is a rigid board which is formed in a substantially rectangular flat plate shape. The control board 13 is fixed to an upper face of a card accommodating part 16 of the main body frame 6 in which a rear end side portion of an inserted card 2 is accommodated.

The control board 13 is provided with a data signal circuit layer in which a data signal circuit is formed for transmitting a signal of magnetic data (data signal) read from a magnetic stripe 2b of a card 2 by the magnetic head 7.

Further, the control board 13 performs communication with an IC chip of a card 2 by the IC contact block 17.

(Structure Relating to Foreign Matter Accommodation)

Figure 4:
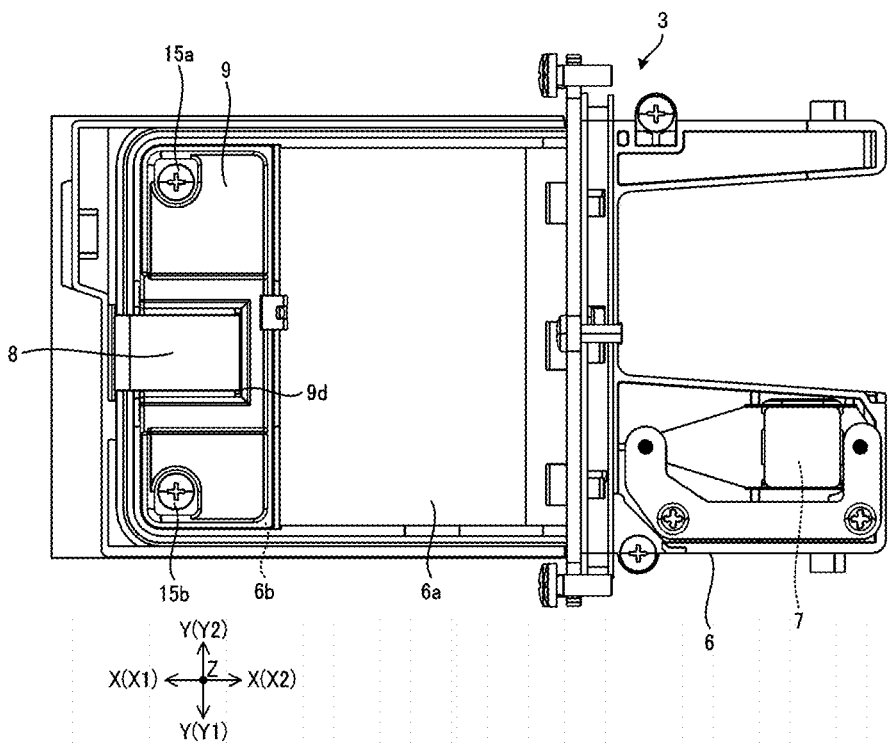
FIG. 4 is a bottom view showing the card reader 1 in the state shown in FIG. 2.
Figure 5:
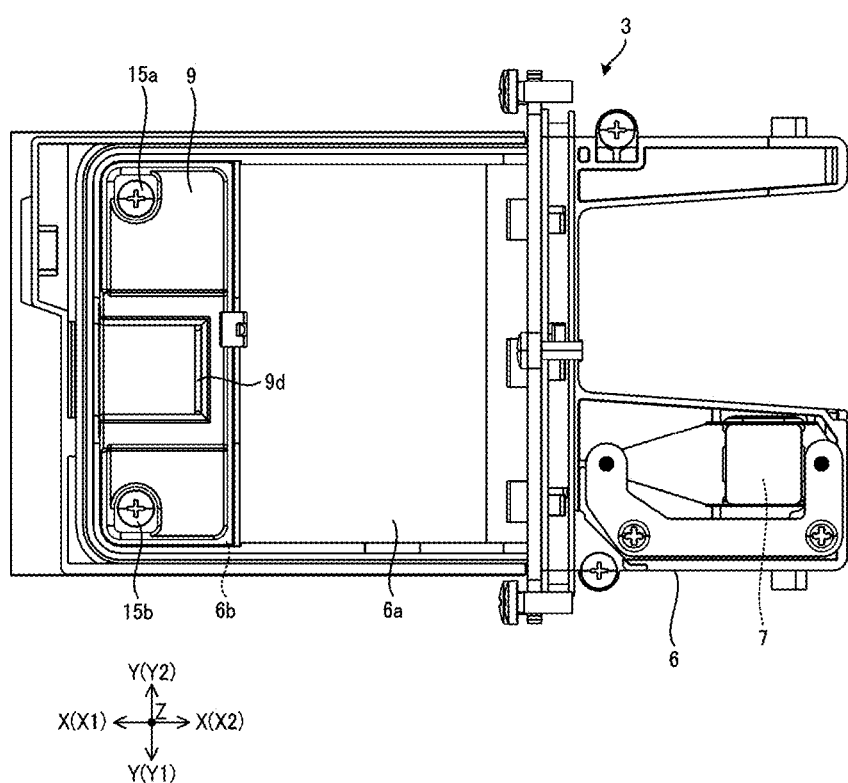
FIG. 5 is a bottom view showing a state that a wiring 8 is detached from the card reader 1 shown in FIG. 4.
Figure 6:
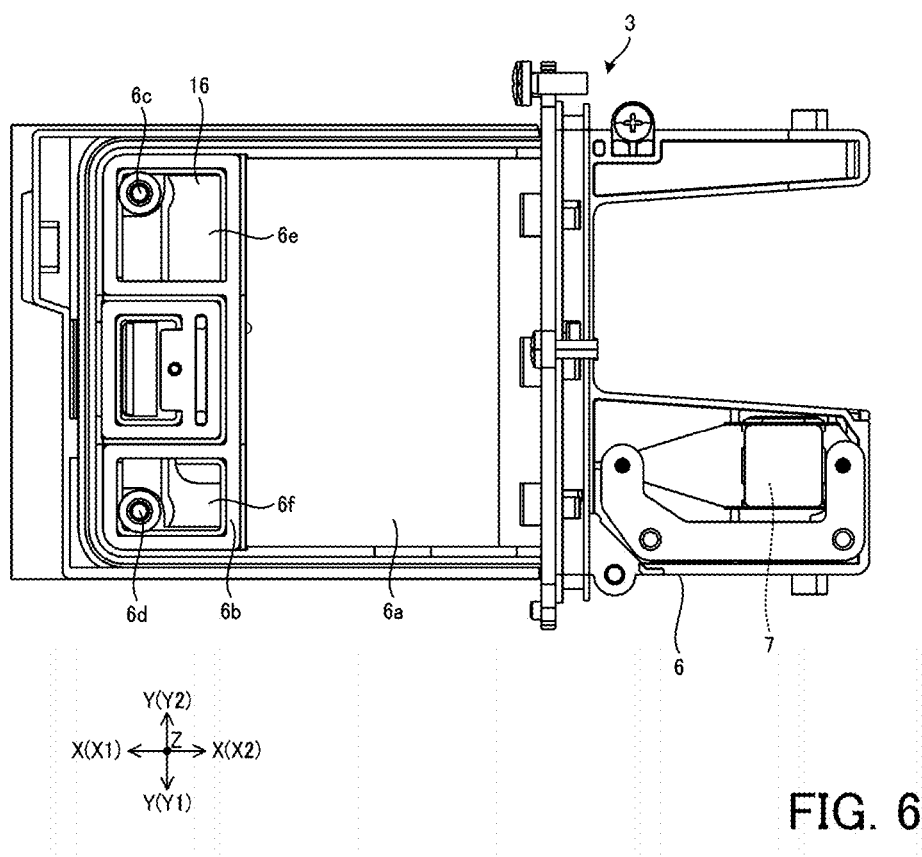
FIG. 6 is a bottom view showing a state that a foreign matter accommodation member 9 is detached from the card reader 1 shown in FIG. 5.
Figure 7:
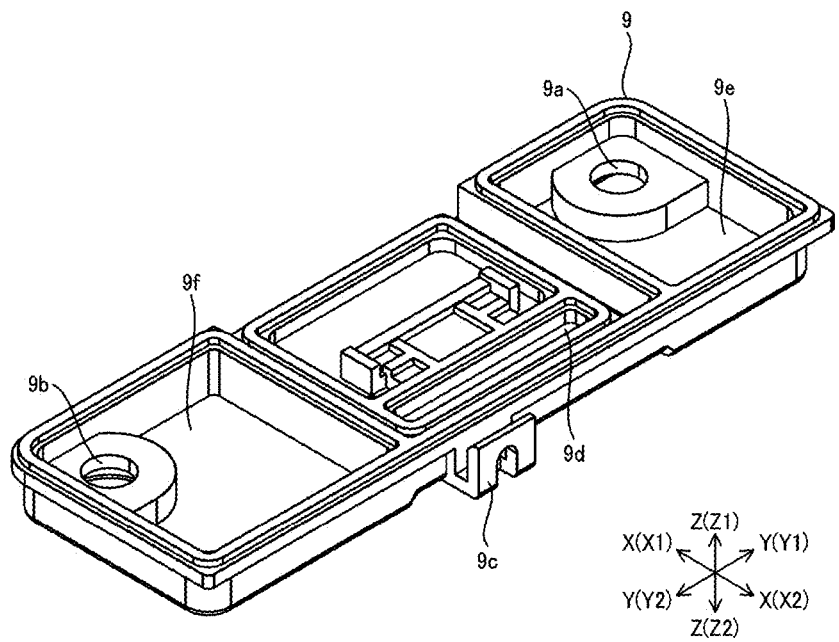
FIG. 7 is a perspective view showing a foreign matter accommodation member 9.
Figure 8:
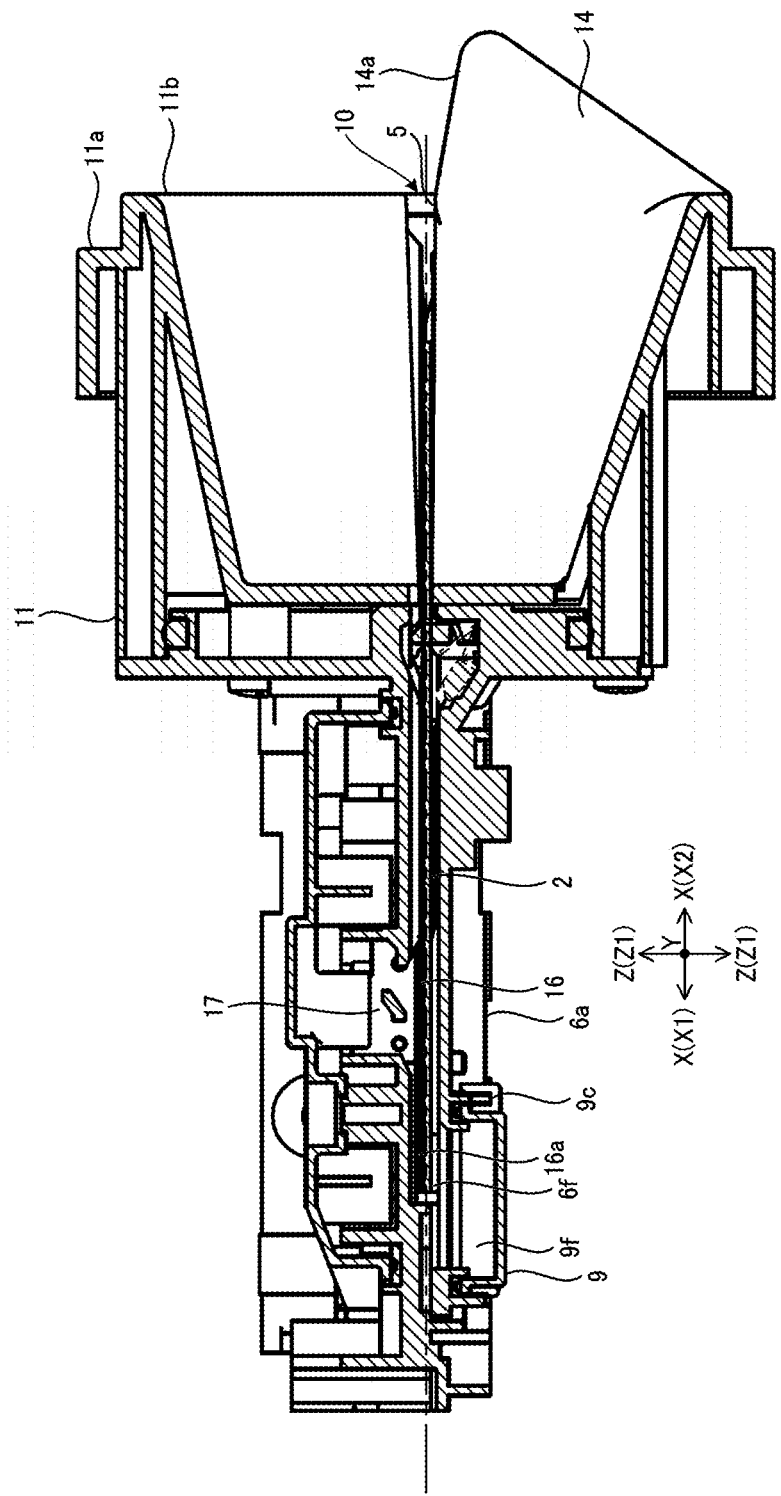
FIG. 8 is a cross-sectional view showing a state that a main case body 12 and a control board 13 are detached from the card reader 1 shown in FIG. 1.
Figure 9:
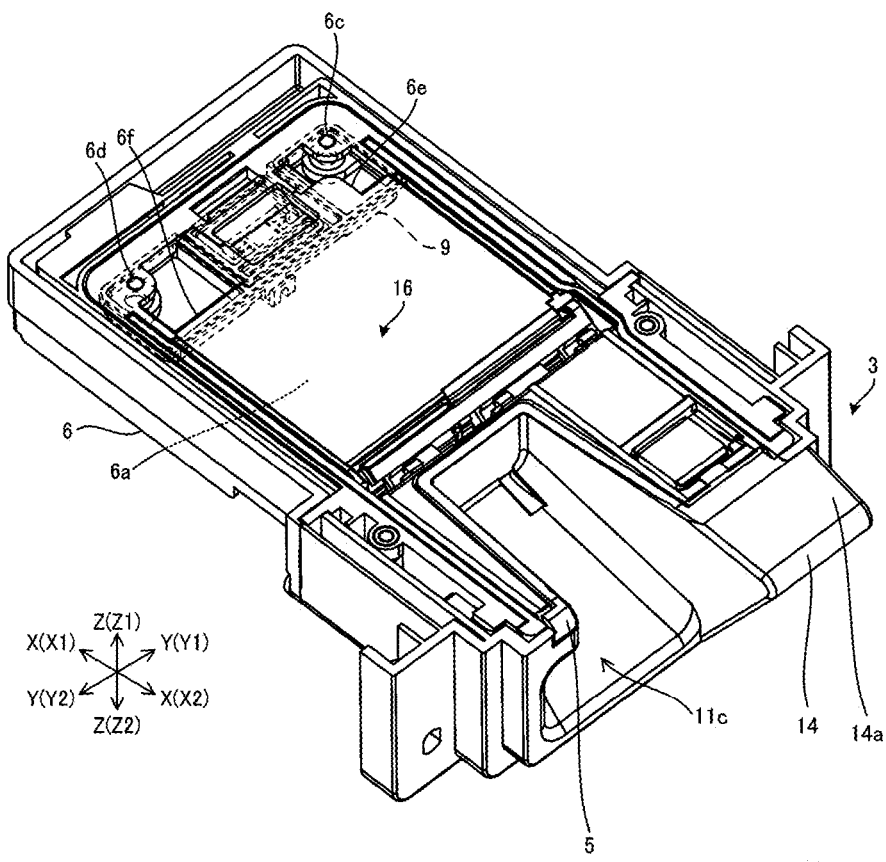
FIG. 9 is a perspective view showing the card reader 1 in which an upper portion with respect to the card accommodating part 16 is not shown in the card reader 1 shown in FIG. 8.

FIG. 4 is a bottom view showing the card reader 1 in the state shown in FIG. 2. FIG. 5 is a bottom view showing a state that a wiring 8 is detached from the card reader 1 shown in FIG. 4. FIG. 6 is a bottom view showing a state that a foreign matter accommodation member 9 is detached from the card reader 1 shown in FIG. 5. FIG. 7 is a perspective view showing a foreign matter accommodation member 9. FIG. 8 is a cross-sectional view showing a state that the main case body 12 and the control board 13 are detached from the card reader 1 shown in FIG. 1. FIG. 9 is a perspective view showing the card reader 1 in which an upper portion with respect to the card accommodating part 16 in the card reader 1 shown in FIG. 8 is not shown. In FIG. 9, the foreign matter accommodation member 9 is indicated by a broken line.

As shown in FIG. 4, a bottom face of the main body frame 6 of the card reader 1 is provided with a foreign matter accommodation member 9. The foreign matter accommodation member 9 is, as shown in FIG. 7, provided with screw holes 9a and 9b, a fitting part 9c, a wiring hole 9d and foreign matter accommodation parts 9e and 9f. The foreign matter accommodation member 9 is formed in a substantially rectangular parallelepiped box shape. Further, the foreign matter accommodation member 9 may be formed of a transparent member so that its inside is visible from the outside.

As shown in FIG. 6, a bottom face of the main body frame 6 is provided with a bottom face part 6a and an accommodation member attaching part 6b adjacent to the bottom face part 6a on the "X1" direction side (rear side). The accommodation member attaching part 6b is provided with screw holes 6c and 6d and discharge holes 6e and 6f. The discharge holes 6e and 6f are holes which communicate with the card accommodating part 16 provided in an inside of the card reader main body 3.

The card accommodating part 16 is structured of the main body frame 6 and the like and accommodates a part of a card 2 inserted along the card moving passage 5. The insertion port 10 which is provided in the front face cover 11 is an example of an insertion port into which a card 2 is inserted in the card accommodating part 16. The discharge holes 6e and 6f of the main body frame 6 which structures the card accommodating part 16 are an example of a discharge hole which is capable of discharging a foreign matter from an inside of the card accommodating part 16. A foreign matter in an inside of the card accommodating part 16 includes various foreign matters, which may be entered into an inside of the card accommodating part 16, such as a card piece, paper money, a coin and a paper scrap.

As shown in FIG. 4, the foreign matter accommodation member 9 is attached to the accommodation member attaching part 6b of the main body frame 6 so that the foreign matter accommodation parts 9e and 9f are respectively connected and communicated with the discharge holes 6e and 6f. Therefore, a foreign matter in the inside of the card accommodating part 16 is discharged through the discharge holes 6e and 6f and is accommodated in the foreign matter accommodation parts 9e and 9f of the foreign matter accommodation member 9. Further, the discharge holes 6e and 6f are provided on a lower side of the card accommodating part 16, and the foreign matter accommodation member 9 is also provided on a lower side with respect to the card accommodating part 16. Therefore, a foreign matter in the inside of the card accommodating part 16 is dropped to the foreign matter accommodation parts 9e and 9f of the foreign matter accommodation member 9 through the discharge holes 6e and 6f.

Further, the foreign matter accommodation member 9 structures an airtight space in which a portion except the insertion port 10 is airtight together with the card accommodating part 16. In other words, the card accommodating part 16 is structured so that a portion except the insertion port 10 and the discharge holes 6e and 6f is airtight, and the discharge holes 6e and 6f are closed by the foreign matter accommodation member 9.

Therefore, a foreign matter in an inside of the card accommodating part 16 and the foreign matter accommodation member 9 is unable to be released outside the card accommodating part 16 and the foreign matter accommodation member 9 except the insertion port 10. In accordance with an embodiment of the present invention, in the airtight space which is structured by the card accommodating part 16 and the foreign matter accommodation member 9, the insertion port 10 may be also structured airtight, for example, by providing a shutter which closes the insertion port 10 when a card is not inserted, or by closing the insertion port 10 with an inserted card.

Further, in a state that the fitting part 9c of the foreign matter accommodation member 9 is fitted to an end part of the accommodation member attaching part 6b, when the screw holes 9a and 9b and the screw holes 6c and 6d are screwed with screws 15a and 15b, the foreign matter accommodation member 9 is fixed to the main body frame 6. Therefore, the foreign matter accommodation member 9 can be easily detached from the main body frame 6 by disengaging the screws 15a and 15b. As described above, the foreign matter accommodation member 9 can be attached to and detached from the main body frame 6 (card accommodating part 16).

Further, the bottom face of the foreign matter accommodation member 9 is provided with a wiring hole 9d in a substantially straight line shape. The wiring 8 is passed through the wiring hole 9d, and the wiring hole 9d is closed by the wiring 8. As a result, even when the wiring hole 9d is provided in the foreign matter accommodation member 9, the airtight space is maintained.

The wiring 8 is a wiring which connects the IC contact block 17 with the control board 13. Specifically, the wiring 8 is led out from the IC contact block 17 in the inside of the card accommodating part 16 to the outside of the airtight space which is structured of the card accommodating part 16 and the foreign matter accommodation member 9 through the inside of the card accommodating part 16, the discharge holes 6e and 6f, the inside of the foreign matter accommodation member 9 and the wiring hole 9d. The wiring 8 which is led out to the outside of the airtight space is passed through the "X1" direction side (rear side) with respect to the foreign matter accommodation member 9 and is connected with the control board 13 on the "Z1" direction side (upper side) of the main body frame 6.

As shown in FIG. 8, the discharge hole 6f of the main body frame 6 is provided at an end part on the "X1" direction side of the card accommodating part 16, in other words, an end part on an opposite side to the insertion port 10 in the "X" direction (innermost part of the card accommodating part 16 when viewed from the insertion port 10). In addition, the foreign matter accommodation member 9 is provided so that the foreign matter accommodation part 9f is communicated and connected with the discharge hole 6f. As a result, a foreign matter at the innermost part of the card accommodating part 16 is discharged through the discharge hole 6f and is efficiently accommodated in the foreign matter accommodation part 9f of the foreign matter accommodation member 9.

Similarly, although not shown, the discharge hole 6e of the main body frame 6 is provided at an end part on the "X1" direction side of the card accommodating part 16, in other words, an end part on an opposite side to the insertion port 10 in the "X" direction (innermost part of the card accommodating part 16 when viewed from the insertion port 10). In addition, the foreign matter accommodation member 9 is provided so that the foreign matter accommodation part 9e is communicated and connected with the discharge hole 6e. As a result, a foreign matter at the innermost part of the card accommodating part 16 is discharged through the discharge hole 6e and is efficiently accommodated in the foreign matter accommodation part 9e of the foreign matter accommodation member 9.

Further, as shown in FIG. 7, the foreign matter accommodation parts 9e and 9f are provided at both end parts in the "Y" direction of the foreign matter accommodation member 9, and the foreign matter accommodation part is not provided in a center part in the "Y" direction. A portion of the main body frame 6 which is located on an upper side with respect to a center part of the foreign matter accommodation member 9 is provided with components relating to the IC contact block 17 such as a support member which movably supports the IC contact block 17. As described above, the discharge holes 6e and 6f of the foreign matter accommodation member 9 are provided at positions different from the IC contact block 17 when viewed in the "Z" direction (upper and lower direction), in other words, when viewed in a thickness direction of a card inserted into the card accommodating part 16. As a result, while restraining influence on the IC contact block 17 and components relating to the IC contact block 17, a route where a foreign matter in the inside of the card accommodating part 16 is discharged to the foreign matter accommodation member 9 can be secured.

(Principal Effects in this Embodiment)

In the card reader 1 in this embodiment, the discharge holes 6e and 6f which are capable of discharging a foreign matter in an inside of the card accommodating part 16 are provided in the card accommodating part 16, and the foreign matter accommodation member 9 is provided which accommodates a foreign matter discharged from the discharge holes 6e and 6f and structures an airtight space together with the card accommodating part 16. Therefore, unintended release of a foreign matter in the inside of the card accommodating part 16 can be restrained. As a result, for example, in a case that the card reader 1 is mounted on a host apparatus such as an ATM, a foreign matter which is released and dropped from the card reader 1 is prevented from entering into another device in the inside of the host apparatus.

Further, the foreign matter accommodation member 9 is structured to be capable of being attached and detached and thus, foreign matters collected in the card accommodating part 16 and the foreign matter accommodation member 9 can be easily discharged. For example, in a case of repair or maintenance of the card reader 1, when the foreign matter accommodation member 9 is detached, foreign matters accumulated in the card accommodating part 16 and the foreign matter accommodation member 9 can be easily discharged.

OTHER EMBODIMENTS

Although the present invention has been shown and described with reference to a specific embodiment, various changes and modifications will be apparent to those skilled in the art from the teachings herein.

For example, in the embodiment described above, the card accommodating part 16 accommodates a part of an inserted card 2. However, it may be structured that the card accommodating part 16 accommodates the entire inserted card 2.

Further, in the embodiment described above, the foreign matter accommodation member 9 is provided with two foreign matter accommodation parts (foreign matter accommodation parts 9e and 9f). However, the number of the foreign matter accommodation parts of the foreign matter accommodation member 9 may be one or three or more. In this case, the number and positions of the discharge hole (for example, the discharge holes 6e and 6f) of the card accommodating part 16 are provided so as to match the number and positions of the foreign matter accommodation parts of the foreign matter accommodation member 9.

Further, in the embodiment described above, the card reader 1 is structured to be capable of reading data from a card 2. However, the card reader 1 may be structured to be also capable of writing data to a card 2.

As described above, the following embodiments are disclosed in the present specification.

(1) A card reader which includes a card accommodating part having an insertion port into which a card is inserted, accommodating at least a part of the card having been inserted and having a discharge hole capable of discharging a foreign matter from an inside of the card accommodating part, and a foreign matter accommodation member which accommodates the foreign matter discharged through the discharge hole and is capable of being attached and detached, and the foreign matter accommodation member structures an airtight space together with the card accommodating part which is airtight in a portion at least except the insertion port.

According to the above-mentioned structure (1), a discharge hole which is capable of discharging a foreign matter in an inside of the card accommodating part is provided in the card accommodating part, and the foreign matter accommodation member is provided which accommodates a foreign matter discharged through the discharge hole and structures an airtight space together with the card accommodating part. Therefore, unintended release of a foreign matter in an inside of the card accommodating part can be restrained. Further, the foreign matter accommodation member is capable of being attached and detached and thus, discharge of a foreign matter in an inside of the card accommodating part can be easily performed.

(2) In the card reader described in the above-mentioned structure (1), the discharge hole is provided at an end part on an opposite side to the insertion port in the card accommodating part.

According to the above-mentioned structure (2), the discharge hole is provided in a portion of the card accommodating part where foreign matters are most likely to be accumulated and thus, a foreign matter in an inside of the card accommodating part can be efficiently discharged to the foreign matter accommodation member. Therefore, foreign matters in the inside of the card accommodating part can be reduced, and operation failure caused by a foreign matter in the card accommodating part can be restrained. Further, in a case of repair and maintenance of the card reader, when the foreign matter accommodation member is detached and the card reader is inclined so that a portion of the discharge hole is located on a lower side of the card accommodating part, a foreign matter in the card accommodating part can be efficiently discharged.

(3) In the card reader described in the above-mentioned structure (1) or (2), the card reader includes a reading part which reads information from the card accommodated in the card accommodating part, and the foreign matter accommodation member has a wiring hole through which a wiring of the reading part is led out from the airtight space to an outside of the airtight space.

According to the above-mentioned structure (3), a wiring hole for leading out a wiring of a reading part from an airtight space to the outside of the airtight space is provided in the foreign matter accommodation member and thus, another member having a wiring hole is not required to be separately provided from the foreign matter accommodation member and the number of components can be reduced.

(4) In the card reader described in the above-mentioned structure (3), the reading part is a contact block which reads information from an integrated circuit chip of the card, and the discharge hole is provided at a position different from the contact block when viewed in a thickness direction of the card inserted in the card accommodating part.

According to the above-mentioned structure (4), while restraining influence on the contact block and components relating to the contact block, a route where a foreign matter in the inside of the card accommodating part is discharged to the foreign matter accommodation member can be secured.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for using with a card, the card reader comprising:
    a card accommodating part which comprises an insertion port into which the card is inserted, accommodates at least a part of the card having been inserted, and comprises a discharge hole which discharges a foreign matter in an inside of the card accommodating part; and
    a foreign matter accommodation member which accommodates the foreign matter discharged through the discharge hole and being attachable and detachable;
    wherein the foreign matter accommodation member structures an airtight space together with the card accommodating part, the airtight space being airtight in a portion at least except the insertion port;
    and further comprising a reading part which reads information from the card which is accommodated in the card accommodating part,
    wherein the foreign matter accommodation member comprises a wiring hole through which a wiring of the reading part is led out from the airtight space to an outside of the airtight space.

2. The card reader according to claim 1, wherein the discharge hole is provided at an end part on an opposite side to the insertion port in the card accommodating part.

3. The card reader according to claim 2, further comprising a reading part which reads information from the card which is accommodated in the card accommodating part,
    wherein the foreign matter accommodation member comprises a wiring hole through which a wiring of the reading part is led out from the airtight space to an outside of the airtight space.

4. The card reader according to claim 3, wherein
    the reading part is a contact block which reads information from an integrated circuit chip of the card, and
    the discharge hole is provided at a position different from the contact block when viewed in a thickness direction of the card inserted in the card accommodating part.

5. The card reader according to claim 1, wherein
    the reading part is a contact block which reads information from an integrated circuit chip of the card, and
    the discharge hole is provided at a position different from the contact block when viewed in a thickness direction of the card inserted in the card accommodating part.

* * * * *